| United States Patent [19] | [11] | 4,303,559 |
|---|---|---|
| Trost | [45] | Dec. 1, 1981 |

[54] PROCESS FOR THE REUTILIZATION OF PAINT SLUDGES

[75] Inventor: Sergio Trost, Volvera, Italy

[73] Assignee: Centro Ricerche Fiat S.p.A., Orbassano, Italy

[21] Appl. No.: 141,532

[22] Filed: Apr. 18, 1980

[30] Foreign Application Priority Data

May 16, 1979 [IT] Italy ................................ 68035 A/79

[51] Int. Cl.$^3$ ............................................. C08J 11/04
[52] U.S. Cl. ...................................... 260/2.3; 260/21; 260/22 T; 260/29.6 R; 260/29.6 PT; 521/50
[58] Field of Search ........... 260/2.3, 22 T, 21, 29.6 R, 260/29.6 PT

[56] References Cited

U.S. PATENT DOCUMENTS 3,736,277   5/1973   Bender ................................ 260/2.3

*Primary Examiner*—Harold D. Anderson
*Attorney, Agent, or Firm*—Sughrue, Mion, Zinn, Macpeak and Seas

[57] ABSTRACT

Aqueous paint sludges containing thermosetting synthetic resins are converted into shaped articles by breaking the sludge into fragments, drying said fragments, grinding said fragments to a size not exceeding 0.6 mm, compacting the resulting particles and heating the resulting body to achieve agglomeration of the particles and thermosetting of the resin. The material thus obtained may be used as building or insulating components.

14 Claims, No Drawings

PROCESS FOR THE REUTILIZATION OF PAINT SLUDGES

The present invention relates to a process for the reutilization of paint sludges, and particularly industrial paint sludges from spray booths.

All industries which make use of paints, but above all those in the mechanical and metallurgical sectors, given the enormous quantities of ferrous materials produced by them which must be protected from external agents by means of paint, have always had to resolve the serious difficulty of the disposal of the sludges resulting from such operations.

As is known, in spray booths, only part of the atomized paint is deposited on the object to be painted. In order to avoid the remaining part from forming deposits on the walls of the booth, the walls are protected by cascades of water which capture the excess paint. The resulting mixture is collected in vessels from which an aqueous phase, which is generally recycled after filtration, and a more or less dense mass, called the paint sludge, are obtained by decantation.

The methods generally used for disposing of these sludges are based essentially on controlled discharge and incineration. The controlled discharge requires the construction of expensive, impermeable vessels since the sludges are rich in dangerous substances, such as heavy metals, solvents and other substances, which could poison wells, springs and water courses. Incineration presents problems of atmospheric pollution and requires considerable quantities of fuel.

Regenerative-type methods, consisting of the chemical treatment of the sludges to recover poor quality paints or other valuable components, have given poor results and have been shown to be too expensive because of the gummy consistency of the sludges, the presence of water, solvents and various impurities, degradation and agglomeration phenomena etcetera. For the same reason, the recovery of the sludges as binders for use of the binding properties of the resins present in them, has not been considered possible.

It has also been proposed to use the paint sludges as inert fillers, after suitable mechanical treatment to remove the greater part of the volatile components contained therein, followed by thermal treatment at about 200° C. to induce hardening of the resins present in the sludges and further removal of volatile components, and finally by breaking into particles. The residual moisture content of these inert fillers being substantial, it has only been possible to use these until now in mixtures with wood particles, in small proportions, for making boards by the addition of a thermosetting binder and hot-pressing.

An object of the present invention is to re-use paint sludges by means of a simple, economic method which is able to allow their conversion in considerable quantities into manufactured products having interesting properties, usable in various fields of application.

According to the present invention, a process is proposed for the re-use of aqueous paint sludges containing thermosetting synthetic resis characterised by the operations of:

(a) breaking up the sludge in order to obtain distinct, semi-solid fragments, of a size generally not greater than 1 cm, (b) drying these fragments without substantially reducing the thermosetting properties of the resin contained therein, to obtain dried fragments having a weight loss not greater than 20% after a heat treatment at 105° C. for 2 hours, (c) grinding the dried fragments to obtain ground particles of a size generally not greater than 0.6 mm, (d) compacting the particles to obtain a coherent, porous, gas-permeable solid, and (e) heating the solid to a temperature, and for a time, sufficient to produce agglomeration of the particles and at least partial thermosetting of the resin contained in the said particles.

As is known, the paints used, for example, in painting the bodywork of motor-vehicles and, in particular, in the stage of application of the enamel contain thermosetting, synthetic resins, such as, for example thermosetting, modified alkyd resins or acrylic resins. These latter consist mainly of acrylic-melamine or acrylic-isocyanic copolymers. The modified alkyd resins are generally obtained from polyalcohols, polybasic acids (phthalic-type acid) and modifying saturated oils, and are used in mixture with cross-linking agents, such as amino resins (urea or melamine resins). Other components of the paints are solvents or diluents, pigments and other possible additives.

The paint sludges from enamel coats, after several days of decantation, form a slightly hardened layer which is lighter than the water and which may be recovered and used in the process of the invention after possible elimination of the trapped liquid by simple draining. It is also possible to use enamel paint sludges mixed with sludges from different sources, such as sludges from painting with undercoat or to use sludges from other types of paint.

According to the process of the invention, the paint sludge, which generally contains from 30% to 50% of volatile substances (water, solvent), is broken up into particles to obtain relatively coarse fragments, having sizes generally not greater than 1 cm. With fragments of a size greater than 1 cm it is generally difficult to achieve a sufficient degree of drying in the subsequent drying stage. Moreover, it is generally difficult to obtain fragments smaller than 1 mm with conventional apparatus, given the moist, sticky nature of the sludge. Satisfactory results are generally obtained with fragments of a size less than 5 mm, and preferably of the order of 1 to 2 mm. The breaking up into particles may, for example, be carried out by means of drawing or by means of a revolving ball mill having a mesh sieve of suitable mesh size (for example 1 mm) in the discharge zone.

The fragments thus obtained are subjected to drying to obtain dried fragments having a loss of weight, measured after two hours at 105° C., not greater than 20% and preferably of the order of 5% to 15%. It is, in fact, essential for the residual moisture content (water and solvent) to be reduced to values which are sufficient to allow the grinding and subsequent compaction to be carried out.

The drying may conveniently be carried out at ambient temperature in air. It has been experimentally ascertained that stay times of 48 hours in air are generally sufficient to obtain satisfactory results. The drying may also be carried out in an oven at higher temperatures, for example at 50° to 60° C., and possibly even under vacuum. In each case, the drying conditions (temperature, time) must be such as substantially to avoid thermosetting of the resin, even though a slight superficial hardening of the fragments is not harmful for the purpose of the present invention.

The dried fragments are then ground to obtain particles of a size less than 0.6 mm. It has been experimentally ascertained that the use of particles of a size greater than 0.6 mm leads to unsatisfactory results, both with regard to compaction, the levelling of the powder being difficult, and with regard to the quality of the manufactured article, which has a poor consistency. With sizes from 0.6 mm to 0.106 mm the results are generally satisfactory but the use of particles having a size of from 0.106 mm to 0.063 mm and preferably less than 0.063 mm generally allows products to be obtained with improved mechanical characteristics, the other operative conditions being the same. It will be clear from what has been stated above that the particle size may be chosen for each case according to the use for which the final products is intended.

The grinding may be carried out in a ball mill, or in other more efficient apparatus, such as vibratory colloid mills, with considerable reduction in the operating times.

The particles are then compacted to obtain a coherent solid having sufficient residual porosity to allow at least partial elimination of the residual moisture through the pores during the subsequent heat-treatment stage. The values of the residual porosity may vary within wide limits, according to the use for which the final product is intended. Thus, for example, when it is to be used as thermal or sound insulating panels, the residual porosity should preferably be greater than 10% to 15% and may reach values of the order of 40% or even greater than 40%, according to the size of the particles used. With a residual porosity less than 15%, for example down to 5%, manufactured articles with improved mechanical characteristics are generally obtained. The best results are generally obtained with a porosity of the order of 10%, also depending on the size of the particles.

The compaction may be carried out by known methods, for example by means of cold pressing with the usual hydraulic press, a pressure of from 100 to 500 kg/cm$^2$, or even greater, being used.

The solid is then subjected to a heat treatment to achieve the agglomeration or sintering of the particles, and at least partial hardening of the resin. The conditions of the thermal treatment are also preferably such as to ensure a substantial removal of the residual moisture content of the particles.

The temperature used obviously depends on the type of resin present in the particles, and is generally from 160° to 200° C., best results generally being obtained with temperatures of from 180° to 190° C. The thermal treatment conditions are preferably such as to ensure at least an 80% degree of hardening of the resin in the final product. The time for the treatment may also vary within wide limits. However, it has been discovered that, other operating conditions being the same, the thermal treatment time influences the mechanical properties of the manufactured article. With values which are too low, (typically less than 45 minutes) mechanical properties which are not very satisfactory are obtained, while with too high values (typically greater than 120 to 150 minutes) a slight worsening of the mechanical properties, and in particular of the bending strength, is generally obtained. It is not usually necessary to use times greater than 240 minutes, and the best results are generally obtained with times of the order of 120 minutes.

The thermal treatment may be carried out in conventional apparatus, for example in a simple thermostatted oven. The cooling of the manufactured article which is obtained may, with advantage, be carried out in the compaction mould or like apparatus, to avoid any possible deformation. The material thus obtained has good mechanical properties and appreciable heat and sound insulating properties. Thus, for example, with particles of a size less than 0.063 mm, a material may be obtained having a bending strength greater than 400 kg/cm$^2$. The material may be used as building components, for example in the sheet flooring, in which the use of an insulating slab is required, or as structural insulating components of water- or air-heating solar collectors.

The material may be produced in the form of paving tiles for making into panels by means of glueing the edges.

According to one embodiment of the process of the invention, particles of inert fillers or other possible additives are added during the process to modify the mechanical properties or insulating properties of the material. The inert fillers may be organic or inorganic, and may generally be present in quantities of up to 50% by weight in the resulting mixture. Thus, for example, it is possible to add a fibrous material, and in particular glass fibres, to improve the mechanical properties. It is also possible to add insulating materials, such as Vermiculite, or recycled materials, wood sawdust etcetera. A case of particular interest is the use, as the inert fillers, of ground scraps or waste of thermohardened-resin-based materials which are used in various fields of application, in that these scraps or waste are difficult to dispose of and may be used with advantage in the process of the invention.

The inert fillers are preferably added to the particles obtained in the grinding stage, even though it is possible to add them, in certain cases, to the fragments to be dried or directly to the paint sludge.

EXAMPLE 1

A paint sludge resulting from the operations of applying enamel paint in the paint line for motor-vehicle bodywork was used. The paint used had the following composition by weight:

| | |
|---|---|
| short-oil-alkyd resin, in solution in xylene (dry content 50%) | 34.28% |
| butylated melamine resin, in solution in a xylene-butanol mixture in a 1:1 ratio (dry content 60%) | 12.23% |
| TiO$_2$-rutile | 23.10% |
| xylene | 10.39% |
| trimethylbenzene and tetramethylbenzene isomers | 20.00% |

The paint sludge recovered after several days in the decantation vessel was converted into fragments by means of treatment in a rotating ball mill of the SK1 type made by RETSCH, and having a 1 mm—mesh sieve in the discharge zone. The loss in weight of the fragments thus obtained, determined at 105° C.×2 hours, was 33%.

The fragments were then dried at ambient temperature in air for 48 hours. The drying time of 48 hours was sufficient to obtain a reduction in the volatile-substance content to the desired values, both on the surface, and in the heart of the drying container. The loss in weight, determined at 105° C.×2 hours on the dried fragments, was of the order of 10%.

The dried fragments were ground in a ball mill to obtain particles having sizes of from 0.25 to 0.60 mm.

The particles thus obtained were compacted by means of cold pressing with an hydraulic press at a pressure of 383 kg/cm².

The solid thus obtained was subjected to a thermal sintering and hardening treatment, this being carried out a temperature of 180° to 188° C. for a time of 45 minutes.

The results obtained in two different tests are shown in table 1.

TABLE 1

|  | Unsintered | | Sintered | |
| --- | --- | --- | --- | --- |
|  | Test 1 | Test 2 | Test 1 | Test 2 |
| Length (mm) | 67.06 | 67.06 | 62.14 | 62.10 |
| Width (mm) | 13.08 | 13.09 | 12.11 | 12.10 |
| Height (mm) | 9.90 | 9.69 | 9.83 | 9.75 |
| Weight (g) | 8.60 | 8.57 | 7.42 | 7.42 |
| Density (g/cm³) | 0.99 | 1.01 | 1.00 | 1.01 |
| Breaking (kg) | — | — | 43 | 49 |
| b.s. (kg/cm²) | — | — | 127.5 | 159.8 |

In particular, the bending strengths (b.s.) tests were carried out with INSTRON apparatus, model 115. The values indicated were calculated from the formula:

$$b.s. = \frac{3}{2} \frac{PL}{s^2 b}$$

where (P) is the load in kilograms necessary to break the test piece; (L) is the distance between the supports in centimeters; (b) is the width in centimeters of the test piece and (s) is the thickness in centimeters of the test piece.

EXAMPLE 2

This was carried out as in Example 1, with grinding of the fragments such as to allow particles of a size of from 0.106 to 0.063 mm to be obtained. The particles thus obtained were compacted under the conditions of Example 1. The solid was subjected to the same thermal treatment at 180° to 188° C. The results obtained in four tests carried out with different thermal treatment times are indicated in Table 2. In particular, in test A the time was 45 minutes, in test B 120 minutes, in test C 180 minutes and in test D it was 240 minutes.

TABLE 2

|  | Unsintered | | | | Sintered | | | |
| --- | --- | --- | --- | --- | --- | --- | --- | --- |
|  | A | B | C | D | A | B | C | D |
| Length (mm) | 67.20 | 67.18 | 67.12 | 67.17 | 62.02 | 61.18 | 60.64 | 60.31 |
| Width (mm) | 13.06 | 13.07 | 13.04 | 13.06 | 11.97 | 11.86 | 11.73 | 11.69 |
| Height (mm) | 6.86 | 7.73 | 7.65 | 7.70 | 7.38 | 8.15 | 8.33 | 8.01 |
| Weight (g) | 6.10 | 7.03 | 7.02 | 6.93 | 5.30 | 5.96 | 5.82 | 5.72 |
| Density (g/cm³) | 1.01 | 1.04 | 1.05 | 1.03 | 0.97 | 1.01 | 0.98 | 1.01 |
| Breaking (kg) | — | — | — | — | 33 | 65 | 55 | 59 |
| b.s. (kg/cm²) | — | — | — | — | 189.8 | 309.4 | 253.4 | 295.0 |

EXAMPLE 3

This was carried out as in Example 1, with grinding of the fragments such as to allow particles with sizes less than 0.063 mm to be obtained. The particles thus obtained were compacted under the conditions of Example 1. The solid was subjected to the same thermal treatment at 180° to 188° C. The results obtained in four tests carried out with different thermal treatment times are indicated in Table 3. In particular, in test A the time was 45 minutes, in test B 120 minutes, in test C 180 minutes and in test D the time was 240 minutes.

TABLE 3

|  | Unsintered | | | | Sintered | | | |
| --- | --- | --- | --- | --- | --- | --- | --- | --- |
|  | A | B | C | D | A | B | C | D |
| Length (mm) | 67.12 | 67.14 | 67.14 | 67.11 | 62.08 | 60.40 | 60.54 | 60.28 |
| Width (mm) | 13.09 | 13.06 | 13.05 | 13.05 | 12.75 | 11.74 | 11.86 | 11.94 |
| Height (mm) | 7.46 | 7.51 | 7.28 | 7.37 | 7.08 | 7.74 | 7.86 | 8.14 |
| Weight (g) | 6.90 | 6.91 | 6.89 | 6.95 | 6.17 | 6.02 | 6.02 | 5.96 |
| Density (g/cm³) | 1.05 | 1.05 | 1.08 | 1.08 | 1.10 | 1.10 | 1.07 | 1.02 |
| Breaking (kg) | — | — | — | — | 55 | 80 | 80 | 86 |
| b.s. (kg/cm²) | — | — | — | — | 322.7 | 426.6 | 409.4 | 407.6 |

We claim:

1. A process for reclaiming aqueous paint sludge containing at least one synthetic thermosetting resin, which comprises the steps of:
   (a) breaking the sludge into particles to obtain distinct, semisolid fragments, of a size not exceeding 1 cm,
   (b) drying these fragments without substantially reducing the thermosetting properties of the resin present therein, to obtain dried fragments having a weight loss not greater than 20% after a heat treatment at 105° C. for 2 hours,
   (c) grinding the dried fragments to obtain ground particles of a size not exceeding 0.6 mm,
   (d) compacting the particles to obtain a coherent, porous, gas-permeable solid, and
   (e) heating the solid to a temperature, and for a time, sufficient to agglomerate the particles and at least partially thermoset the resin contained in said particles.

2. The process of claim 1, in which said fragments have a size of from 5 to 1 mm.

3. The process of claim 1, in which said dried fragments have a weight loss at 105° C. for 2 hours of the order of 5 to 15%.

4. The process of claim 1, wherein said drying treatment is carried out at ambient temperature for a period not exceeding 48 hours.

5. The process of claim 1, wherein said particles have a size of less than 0.106 mm.

6. The process of claim 1, wherein said particles have a size less than 0.063 mm.

7. The process of claim 1, wherein said thermal treatment of the solid is carried out at a temperature of from 160° to 200° C.

8. The process of claim 1, wherein said thermal treatment of the solid is carried out for a time of from 45 to 240 minutes.

9. The process of claim 1, wherein the compacting of the particles is carried out by means of cold pressing.

10. The process of claim 1, wherein at least one paint sludge from at least one different source is used.

11. The process of claim 1, wherein at least one inert filler is added to the particles and possibly to the fragments or to the sludge.

12. The process of claim 11, wherein said inert filler is added in an amount of up to 50% by weight with respect to the resulting mixture.

13. The process of claim 11, wherein glass fibres are added as the inert filler.

14. The process of claim 11, wherein particles of scrap and ground waste of at least one thermohardened-resin is added as the inert filler.

* * * * *